Patented May 24, 1932

1,860,051

UNITED STATES PATENT OFFICE

DAVID PEPPER, OF PHILADELPHIA, PENNSYLVANIA

PROCESS OF FORMING BATTERY PLATES

No Drawing.  Application filed June 12, 1929. Serial No. 370,462.

My invention relates to a process for manufacturing electrodes for electric batteries of the type in which a conducting support is coated with preparations of lead which by subsequent treatment are converted into active material. The object of my invention is to provide an improved process whereby the lead compound can be applied to the conducting support in such a way as to produce a coating of highly homogeneous character distinguished by a desirable porosity and applied in such a manner that the active material formed from the coating will be more uniformly available for the chemical reactions which it undergoes during the charging and discharging of a battery, thus enabling me to construct an electrode with less active material than is now generally employed. Another object of my invention is to make available the use as a conducting support or supports which are thinner, that is, less massive than the supports now generally used. My invention depends upon my discovery that it is possible to electrically deposit on a conducting support used as the cathode of an electrolytic cell finely divided preparations of lead suspended in the electrolyte and that the deposit will or can be of a highly desirabe consistency, porosity and composition especially well adapted for conversion into active material.

In practice I have found that electrolytes well adapted for use with my process are those formed of solutions of compounds of alkali metals electropositive to lead and which in a free state are reactive with water with generation of hydrogen and I have also found that the radicals combined with such metals should be acids which are not oxidizing or hydroxyls. The compounds used as electrolytes must be of such a character as to form a strong and conductive solution to carry the current passing through the cell. My best results have been obtained with compounds of ammonium, magnesium, sodium and potash. When using ammonium and magnesium I prefer to employ them in the form of sulphates and when using sodium and potassium I prefer to employ them as hydroxides, though I have used sodium thiosulphate and sodium sulphate with good results. I have used calcium sulphate with some success, especially where litharge is the lead preparation which is to be deposited on the cathode. I have also used sodium and calcium acetates with, however, less satisfactory results and prefer not to use the acetates on account of the difficulty of eliminating the very detrimental acetic acid from the finished plate. Outside of the class of electrolytes which I have mentioned as preferable I have found that my process can be practiced with an electrolyte formed with a solution of lead nitrate, especially where litharge is the lead preparation held in suspension in the electrolyte but as the nitric acid is an oxidizing radical it will be a matter of a great deal of trouble and expense to eliminate it from the plate, which would be necessary to enable a satisfactory plate to be produced in this way.

The preparations of lead which I have successfully used are all the oxides of lead, finely divided metallic lead, lead sulphate and lead carbonate; the finely divided particles of these preparations can readily be maintained suspended in the electrolyte and under the influence of the electric current will be rapidly deposited on the cathode. With some of the electrolytes mentioned it is obvious that there will be some reaction between the electrolyte and the lead preparation resulting in the formation of soluble salts of lead but in no case will there or need there be anything approaching a complete solution of the suspended particles and the portion thereof dissolved in the electrolyte will be deposited with finely divided particles on the cathodes where the electrolytic action will convert it into spongy lead; it will also be obvious that the deposited particles of lead preparation will by the electrolytic action be partially converted into spongy lead so that the coating on the cathode will in all cases consist in part of the lead preparation suspended in the electrolyte and in part of the spongy lead produced directly or indirectly from these particles. It will also be obvious that it is practicable and it is also sometimes perhaps desirable to dissolve a certain amount of a soluble compound of lead in the electrolyte for the purpose of increasing the conductivity of the electrolyte and also of providing additional material to be deposited electrolytically from the solution.

While, as I have stated above, finely divided metallic lead is one of the preparations of lead which I have found to be usable in my process, I have not found it to be an advisable lead preparation except in the cases where sodium or potassium hydroxides are used as the electrolyte.

With regard to the particle sizes of the lead preparation suspended in the electrolyte and deposited on the cathode, I have found that particles which will pass a sieve of 300 mesh are generally satisfactory.

It is obviously desirable to hold as much of the finely divided lead preparations in suspension as is practicable and this can be increased by mixing colloidal agents, such for instance as glycerine or silicates of soda with the electrolyte and also by energetic agitation of the electrolyte, which agitation is also naturally advantageous as tending to disperse hydrogen promptly from the cathode.

It is of course possible to maintain a practically constant percentage of suspended lead preparation in the electrolyte by adding such preparations to the electrolyte during the electrolytic action.

It is entirely practical by my process to deposit from the electrolyte not only the finely divided particles of lead preparation suspended in it but also to simultaneously deposit fine particles of inactive material such as graphite, lamp black or properly treated wood flour and the use of materials of this kind has a practical value, especially in the preparation of negative plates.

Electrode battery plates prepared in accordance with my invention can be finished and formed by well known means. It is to be noted however that in most cases the plates coated in the electrolytic cell have their deposited lead material partly reduced, which will tend to shorten the process of finishing and forming the negative plates. For this reason it is obviously advantageous in the preparation of positive plates to use the higher oxides of lead.

I have found that the rate at which the particles suspended in the electrolyte are deposited on the cathode is much greater than where the same weight of material is dissolved in the electrolyte and deposited as metallic sponge by the laws of electrolysis and that by charging the number of suspended particles between anode and cathode with a given current I can regulate in the deposit the proportion of solid particles, the amount of surface reduction of particles and the amount of spongy lead deposited from solution.

*Example 1.*—As an example of the application of my process when red lead is used with sulphate of ammonia as electrolyte without agitation I suspend in 100 cc. of a solution of ammonium sulphate 1.20 specific gravity, 100 grams of commercial fumed battery red lead containing 15 to 25% litharge or all that can be kept in suspension and I may add .1 to 2% of glycerine or .1 to .5% silicate of soda to aid in the suspension and help in cementing of plate on drying. If agitation is used 300 grams or more can be suspended.

I use a current of from .1 to .5 ampere per square inch of exposed cathode surface.

The red lead is not acted upon by the sulphate of ammonium but the mixed litharage is slightly sulphated.

The plate is red if current is stopped when desired thickness of from 5 to 8 grams per square inch is obtained and the portion of the red lead reduced to a lower oxide or spongy lead depends on strength of current and time.

*Example 2.*—Using finely divided lead suspended in an electrolyte of caustic soda or potash. I have used an electrolyte of from 5% to 10% of caustic soda in which I have suspended in 100 cc. of electrolyte 300 to 400 grams of finely divided lead and I have used a current of from .2 ampere to 1 ampere per square inch of exposed cathode surface.

Having now described my invention, what I claim as new and desire to secure by Letters Patent, is:

1. In the manufacture of electric battery electrodes in which a conducting support of the electrode to be formed is coated with lead compounds adapted to become active material, the improved method of coating such supports which consists in charging an electrolytic cell with an electrolyte of such composition that it will under conditions of use react upon and bring into solution no more than a portion of the preparation of lead suspended therein, mixing with and suspending in said electrolyte fine particles of preparations of lead adapted for use as an electrode coating, inserting in the electrolyte so prepared as the cathode electrode of the cell the conducting support and depositing thereon by electrical migratory action followed by partial reduction particles of lead preparations suspended in the electrolyte.

2. In the manufacture of electric battery electrodes in which a conducting support of the electrode to be formed is coated with lead compounds adapted to become active material, the improved method of coating such supports which consists in charging an electrolytic cell with an electrolyte of such composition that it will under conditions of use react upon and bring into solution a portion only of the preparation of lead suspended therein, mixing with and suspending in said electrolyte fine particles of preparations of lead adapted for use as an electrode coating, inserting in the electrolyte so prepared as the cathode electrode of the cell the conducting support and depositing thereon by electrical migratory action followed by partial reduction particles of lead preparations suspended in the electrolyte and simultaneously electrolytically depositing lead from the lead salts dissolved in the electrolyte.

3. The method of claim 1 in which the electrolyte consists of an aqueous solution of a compound of an alkali metal which in its metallic state reacts with water with evolution of hydrogen and which is electropositive to lead.

4. The method of claim 1 as carried out with an electrolyte consisting of a solution of a metallic compound in which the radical is non-oxidizing in character.

5. The method of claim 1 as carried out with finely divided inactive material also suspended in the electrolyte and deposited together with the lead preparation on the conducting support.

6. The method of claim 1 as carried out with agitation of the electrolyte.

DAVID PEPPER.